United States Patent
Zhang et al.

(10) Patent No.: US 11,449,406 B2
(45) Date of Patent: Sep. 20, 2022

(54) CONTROLLING A STORAGE SYSTEM BASED ON AVAILABLE POWER

(71) Applicant: EMC IP Holding Company LLC, Hopkinton, MA (US)

(72) Inventors: Min Zhang, Shanghai (CN); Qiulin Cheng, Shanghai (CN); Haohan Zhang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 98 days.

(21) Appl. No.: 16/934,487

(22) Filed: Jul. 21, 2020

(65) Prior Publication Data
US 2021/0216427 A1    Jul. 15, 2021

(30) Foreign Application Priority Data
Jan. 15, 2020   (CN) .......................... 202010044232.2

(51) Int. Cl.
*G06F 11/30* (2006.01)
*G06F 3/06* (2006.01)

(52) U.S. Cl.
CPC ........ *G06F 11/3058* (2013.01); *G06F 3/0614* (2013.01); *G06F 3/0653* (2013.01); *G06F 3/0659* (2013.01); *G06F 3/0673* (2013.01); *G06F 11/3034* (2013.01)

(58) Field of Classification Search
CPC .... G06F 3/0614; G06F 3/0653; G06F 3/0659; G06F 3/0673; G06F 11/3058; G06F 11/1034; G06F 1/3321; G06F 1/28; G06F 1/30; G06F 1/324; G06F 1/3296; G06F 1/3268
See application file for complete search history.

(56) References Cited

U.S. PATENT DOCUMENTS

| | | | |
|---|---|---|---|
| 7,051,233 B2* | 5/2006 | Fukumori | G06F 11/1076 711/114 |
| 7,058,835 B1* | 6/2006 | Sullivan | G06F 1/30 713/300 |
| 9,915,293 B2* | 3/2018 | Kobata | F16D 3/2055 |
| 10,178,808 B2 | 1/2019 | North et al. | |
| 10,761,590 B1* | 9/2020 | Dixon | G06F 1/30 |
| 2009/0121729 A1 | 5/2009 | Farkas | |
| 2010/0226170 A1* | 9/2010 | Lin | G11C 5/144 365/185.03 |
| 2017/0031431 A1* | 2/2017 | Khatri | G06F 1/3234 |
| 2017/0357301 A1* | 12/2017 | Chen | G06F 11/1441 |

* cited by examiner

*Primary Examiner* — Raymond N Phan
(74) *Attorney, Agent, or Firm* — BainwoodHuang

(57) ABSTRACT

Techniques to control a storage system involve: determining whether available power capable of being supplied by a supplying apparatus of the storage system is less than power required by the storage system; and in response to a determination that the available power is less than the power required by the storage system, adjusting an operation parameter of the storage system based on the available power so as to match the power required by the storage system with the available power. In this way, the performance of the storage system can be at a higher level while the performance of the storage system can remain stable in a case where power of a processor is limited.

20 Claims, 5 Drawing Sheets

CONTROLLING A STORAGE SYSTEM BASED ON AVAILABLE POWER

CROSS-REFERENCE TO RELATED APPLICATION

This application claims priority to Chinese Patent Application No. CN202010044232.2, on file at the China National Intellectual Property Administration (CNIPA), having a filing date of Jan. 15, 2020, and having "METHOD OF MANAGING STORAGE SYSTEM, ELECTRONIC DEVICE AND COMPUTER PROGRAM PRODUCT" as a title, the contents and teachings of which are herein incorporated by reference in their entirety.

FIELD

Embodiments of the present disclosure relate to the field of computers, and more specifically to a method of controlling a storage system, an electronic device and a computer program product.

BACKGROUND

The performance of a storage system is always one of the focuses of a user's concern. Factors, such as performance and stability of a processor, performance of a storage disk, read/write access types, input/output (I/O) queue depth and data block size, may affect the performance of the storage system. The Input/Output Operations Per Second (IOPS) is one of key performance indexes of a storage system and/or a storage device. A large IOPS value indicates a high storage performance, and a stable IOPS value indicates a stable storage performance. In general, the user may focus on the IOPS value and its stability, which may determine whether the performance of the storage system and/or the storage device is good and stable. As a result, the user generally expects a stable and high IOPS, which depends on power supply capability of the storage system and a processing capability of the processor to a large extent.

SUMMARY

Embodiments of the present disclosure provide an approach for controlling a storage system.

According to a first aspect of the present disclosure, a method of controlling a storage system is provided. The method includes: determining whether available power capable of being supplied by a supplying apparatus of the storage system is less than power required by the storage system; and in response to a determination that the available power is less than the power required by the storage system, adjusting an operation parameter of the storage system based on the available power so as to match the power required by the storage system with the available power.

According to a second aspect of the present disclosure, an electronic device is provided. The electronic device includes: a processor; and a memory coupled to the processor and having instructions stored therein, the instructions, when executed by the processor, causes the electronic device to perform acts including: determining whether available power capable of being supplied by a supplying apparatus device of the storage system is less than power required by the storage system; and in response to a determination that the available power is less than the power required by the storage system, adjusting an operation parameter of the storage system based on the available power so as to match the power required by the storage system with the available power.

According to a third aspect of the present disclosure, a computer program product is provided. The computer program product is stored on a computer readable medium and includes machine-executable instructions, when executed, causes the machine to execute any step of the method described according to the first aspect of the present disclosure.

The summary is provided to introduce a selection of concepts in a simplified form that are further described below in the detailed description. The summary is not intended to identify key features or essential features of the disclosure, nor is it intended to limit the scope of the disclosure.

BRIEF DESCRIPTION OF THE DRAWINGS

The above and other objectives, features, and advantages of the present disclosure will become more apparent from the following more detailed description of example embodiments with reference to the accompanying drawings. In example embodiments of the present disclosure, like reference symbols refer to like elements.

DETAILED DESCRIPTION OF EMBODIMENTS

Figure 1:
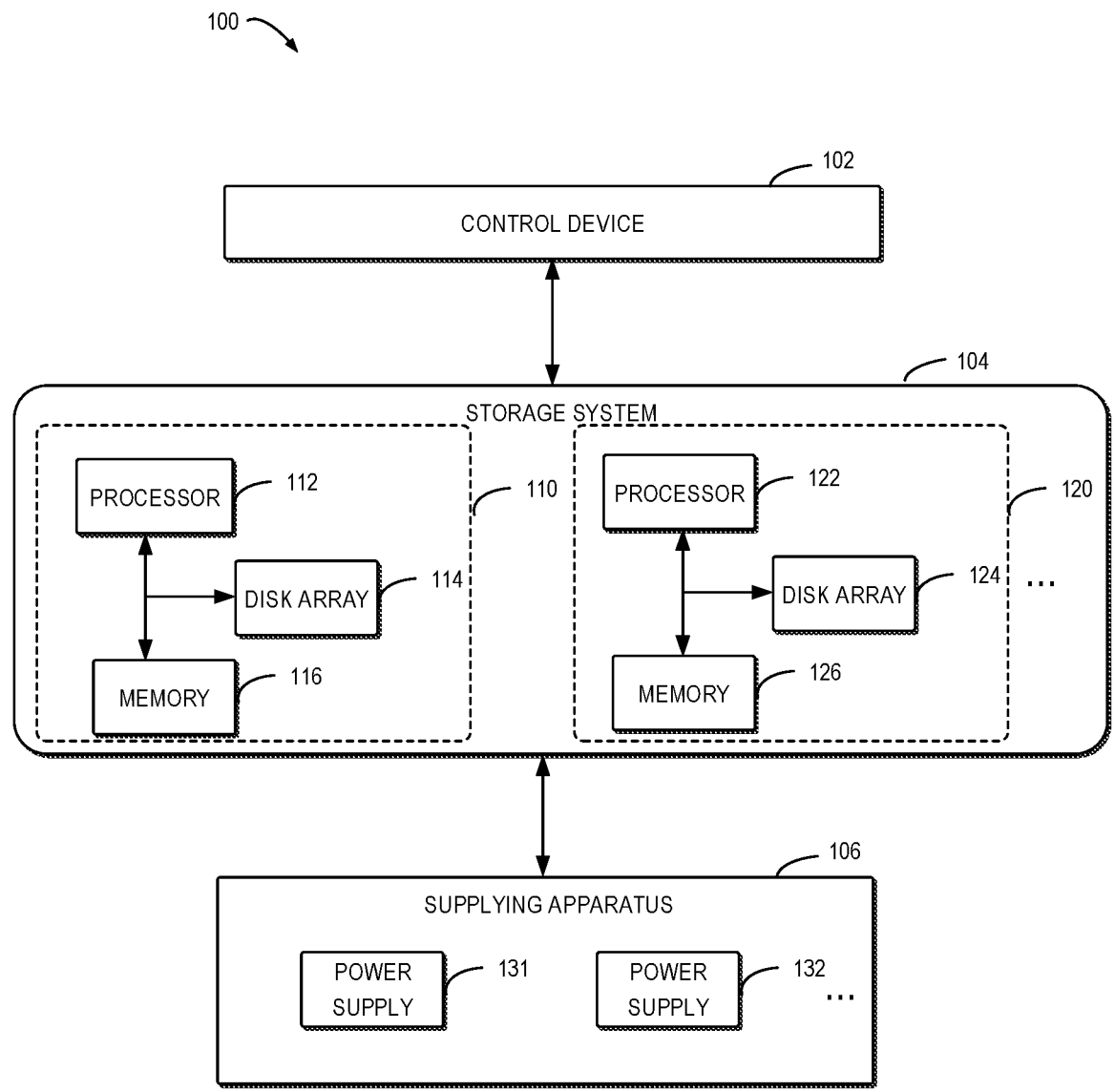
FIG. 1 illustrates a schematic diagram of an example environment according to an embodiment of the present disclosure.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The principles of the present disclosure will be described below with reference to several example embodiments shown in the figures.

As used herein, the terms "include", "comprise", "contain", "have" and their variants are to be read as non-exclusive terms that mean "includes, but is not limited to". Term "or" is to be read as "and/or" unless the context clearly indicates otherwise. Term "based on" is to be read as "based at least in part on". Terms "one example embodiment" and "an example embodiment" are to be read as "at least one example embodiment". Term "another embodiment" is to be read as "at least one further embodiment". Terms "first", "second" and others may denote different or identical objects. The following text may also contain other explicit or implicit definitions.

In various storage systems, a plurality of storage subsystems and a plurality of power supplies are coupled together to provide storage services. Two or more power supply units (PSUs) are coupled together to form a supplying apparatus to supply power to the storage system. Generally, parameters of one PSU are designed to match the power consumed by one storage system, for example, equal to or slightly higher than a maximum power consumption value of the one storage system. However, when the power consumed by the storage system (which may also be referred to as power consumption herein) exceeds a maximum power that can be supplied by the power supply units (e.g., there is at least one fault PSU in two or more PSUs), the power supply capability of the supplying apparatus might fail to meet the power consumption requirements of the storage system. In this case, the storage system may for example enter a throttling mode to reduce its own power consumption.

A processor (such as a CPU with a Turbo mode, designed by Intel) may increase/decrease a processor performance by increasing/decreasing a clock frequency. However, in a conventional system architecture, once the power required by the processor exceeds the available power of the supplying apparatus, the clock frequency and/or power consumption of the processor is forced to be reduced, meaning that the computing performance of the processor is reduced, which in turn leads to the reduction of the performance of the whole system.

The performance and stability of the processor may affect its capacity for processing input/output (I/O) operations of the storage system. A high processor performance means a high overall system power consumption, and vice versa. The inventor has found that the processor may be configured to be in a throttling mode (by reducing the frequency or reducing the power) due to factors such as limitations from power supply, an excessively high temperature, thereby causing a reduction or fluctuation in storage performance, which in turn represents a reduction or fluctuation in the IOPS.

Embodiments of the present disclosure provide an approach for automatically adjusting a power of a storage system. According to this approach, when the storage system enters a throttling mode, that is, when power that can be provided by a supplying apparatus is less than power required by the storage system, power consumption of the storage system is adjusted so that the adjusted power consumption is equal to or approximately equal to the power that can be provided by the supplying apparatus. By means of the above approach, the power that can be provided by the supplying apparatus may just meet the power required by the storage system, so that the storage system has a higher performance. Meanwhile, the storage system will always be in the above-mentioned state with the higher performance, rather than periodically entering the throttling mode in a case where the power supply capability of the supplying apparatus does not change.

FIG. 1 illustrates a schematic diagram of an example environment 100 according to an embodiment of the present disclosure. In the example environment, the device and/or method according to an embodiment of the present disclosure may be implemented. As shown in FIG. 1, the example environment may include a control device 102, a storage system 104 and a supplying apparatus 106. The control device 102, the storage system 104 and the supplying apparatus 106 may communicate via any wired and/or wireless connection.

In one example, by way of illustration rather than limitation, the supplying apparatus 106 may include two power supplies 131 and 132, the storage system 104 may include two storage subsystems 110 and 120, and the power supplies and storage subsystems are coupled together. The storage subsystem 110 may include a processor 112, a memory 116 and a disk array 114, which are connected to one another via a bus and corresponding interfaces. Similarly, the storage subsystem 120 may also include: a processor 122, a memory 126 and a disk array 124. Although in FIG. 1 the supplying apparatus is shown to be external to the storage system, it may be understood that the power supply of the supplying apparatus may also be provided within the corresponding storage subsystem.

The disk arrays 114 and 124 each include a plurality of storage disks for providing storage services. The storage disks may be various types of devices having the storage function, including but not limited to: Hard Disk Drives (HDD), Solid State Disks (SSD), removable disks, any other magnetic storage devices, and any other optical storage devices, or any combination thereof. The memory may include, for example, one or more Random Access Memories (RAM) and/or Read-Only Memories (ROM). The processor 122 may be, for example, a Central Processing Unit (CPU).

The control device 102 is configured to adjust the power of the storage system. Although in FIG. 1 the control device is shown as a remote-control device that communicates with the storage system and is external to the storage system, it may be understood that the embodiments of the present disclosure are not limited thereto. In some embodiments, the control device 102 may, for example, be implemented as a computer program product contained on a computer-readable medium, which may be executed by part of the storage system (e.g., by the processor 112 and memory 116, or by the processor 122 and memory 126). In other embodiments, for example, the control device 102 may be implemented by the processor 112 and the processor 122, as well as corresponding multiple memories in a distributed manner. In still other embodiments, the control device 102 may be implemented by an independent control circuitry on a mainboard of the storage system.

It should be appreciated that for the purpose of illustration, only elements related to embodiments of the present disclosure are described in the example environment 100, which do not imply any limitation on the scope of the present disclosure. For example, in some other implementations, the CPU may contain a single core or multi-cores, and the system architecture may include more storage subsystems and more power supplies.

Hereinafter, a process of controlling a storage system according to an embodiment of the present disclosure will be described in detail with reference to FIG. 2 to FIG. 5. To facilitate understanding, the specific data mentioned in the following text are merely by way of example and are not intended to limit the protection scope of the present disclosure.

Figure 2:
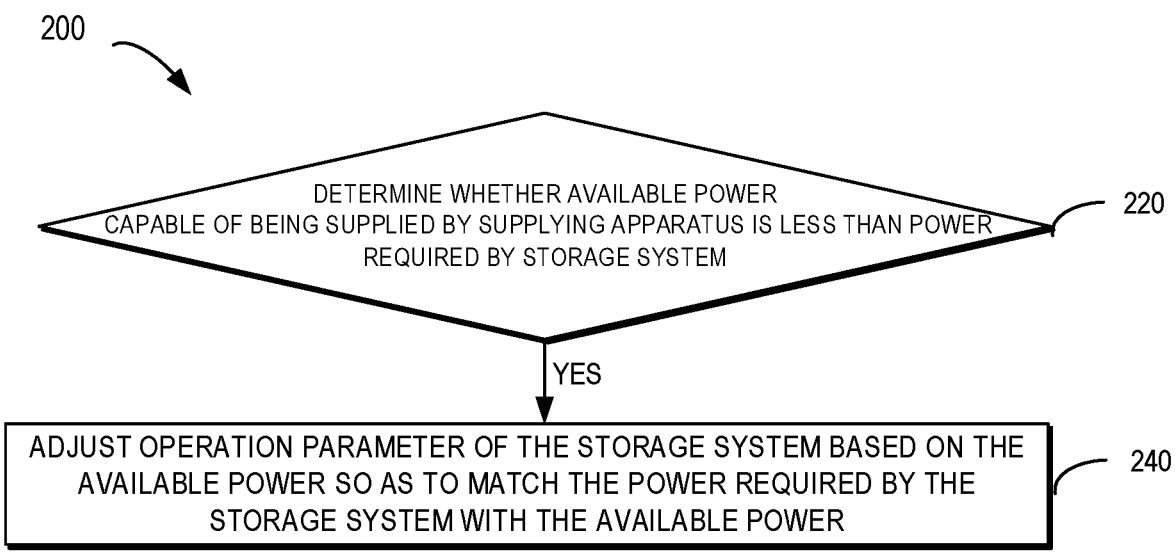
FIG. 2 illustrates a flowchart of a process of controlling a storage system according to an embodiment of the present disclosure.
Figure 3:
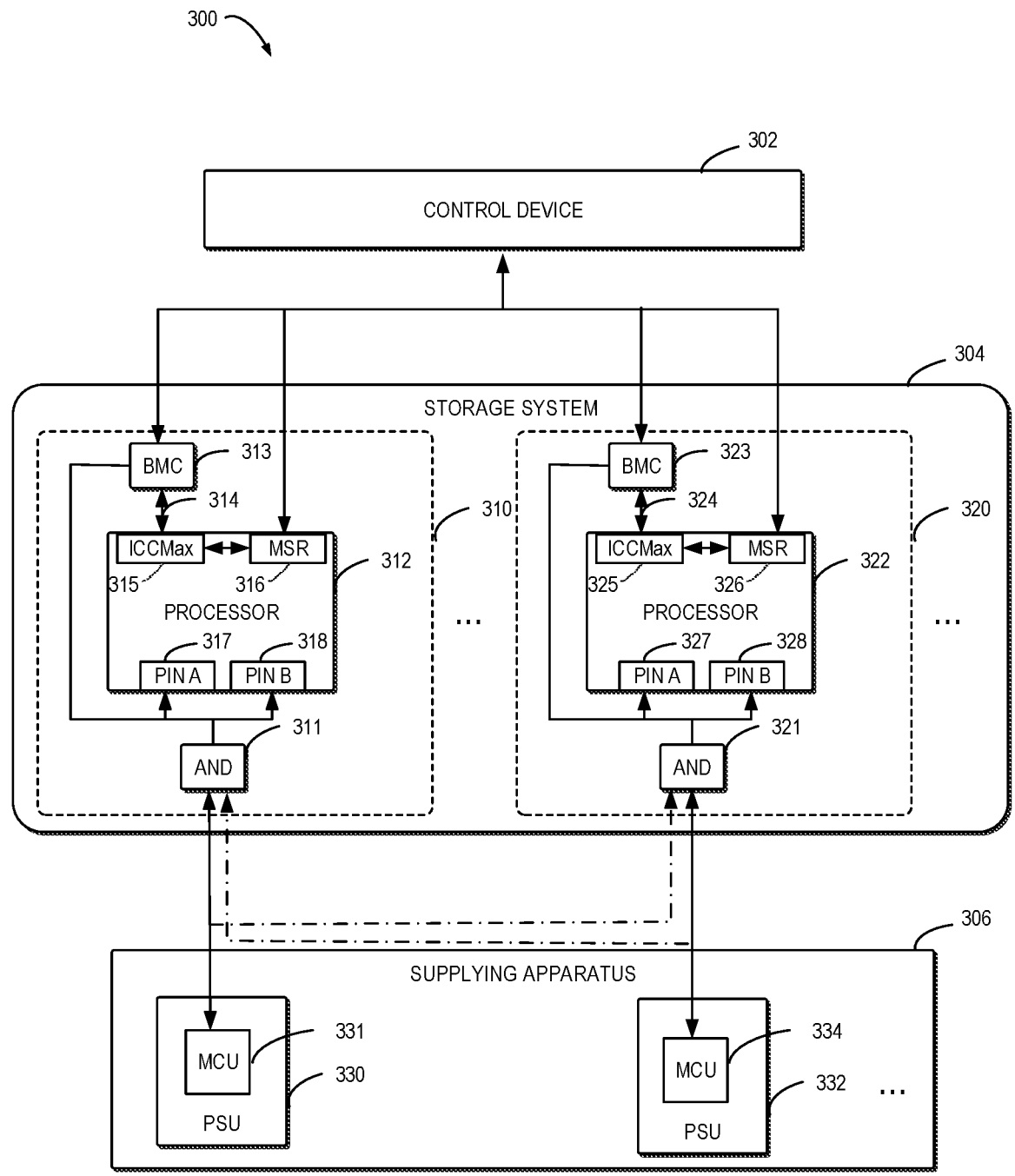
FIG. 3 illustrates an example block diagram of a system architecture according to an embodiment of the present disclosure.

FIG. 2 illustrates a flowchart of a process 200 of controlling a storage system according to an embodiment of the present disclosure. FIG. 3 illustrates an example block diagram of a system architecture 300 according to an embodiment of the present disclosure. The process 200 may be implemented in the control device 102 shown in FIG. 1, or the control device 302 shown in FIG. 3, or other suitable devices. For ease of description, the process 200 is described below in conjunction with the system architecture 300 shown in FIG. 3. It should be understood that the process 200 may also include additional acts not shown and/or acts as shown may be omitted, and the scope of the present disclosure is not limited in this regard.

At 220, a control device 302 determines whether available power that can be supplied by a supplying apparatus 306 of a storage system 304 is less than power required by the storage system 304.

Referring to FIG. 3, FIG. 3 shows a storage system 304 including two storage subsystems 310, 320 and a supplying apparatus 306 including power supplies 330, 332. The power supply 330 mainly supplies power to the storage subsystem 310, but is also coupled to the storage subsystem 320 for supplying power thereto (if required). The power supply 332 mainly supplies power to the storage system 320, but is also coupled to the storage subsystem 310 for supplying power thereto (if required). In some examples, power supplies 330 and 332 include microprocessors 330 and 332, respectively. As previously mentioned, the control device may be implemented in, for example, the storage subsystem 310 (e.g., processor 312) and/or the storage subsystem 320 (e.g., processor 322).

The inventor has found that the storage system may continue to operate according to the current parameter if the control device 302 determines that the available power that can be supplied by the supplying apparatus 306 of the storage system is not less than the power required by the storage system 304 (for example, when the power supply 330 and the power supply 332 both work normally). Otherwise, for example, when the power supply 330 fails whereas the power supply 332 works normally, the power supply 322 will supply power to the storage subsystems 310 and 320 simultaneously. In such a case, a single power supply 332 may not have the capability of simultaneously supplying power to two storage subsystems 310 and 320 with a full load when the I/O operation level of the storage system 304 is high (which may be represented as a large IOPS value).

In some embodiments, the control device 302 determines whether the available power of the supplying apparatus 306 is less than the power required by the storage system 304 in the following manner.

First, the storage system 304 provides the supplying apparatus 306 with information about the power required by the storage system 304, for example, a sum of current power of the storage subsystems 310 and 320, the information includes but is not limited to power consumption of the processors 312 and 322 and power consumption of respective memories and storage disks (not shown). In some other examples, sensors may be provided at the power supplies 330 and 332, or at the storage system 304, and the sensors may determine the current power of the storage system by detecting voltage and current on a cable.

Assuming that only the power supply 332 works normally, the microprocessor 334 may determine that the power supply 332 cannot provide the power required by the storage system 304 based on the current power of the storage system 304 and the power that can be supplied by the power supply 332.

In this case, the microprocessor 334 may generate (assert) a first signal, for example for the purpose of self-protection of the power supply (e.g., to prevent overheating of and damages to the power supply during overload operation). The first signal may be a throttling signal (PSU_Throttling #, where "#" indicates that the signal is active in case of a low level). The microprocessor 334 transmits the throttling signal 196 to the storage subsystem 310 and/or 320 (e.g., to corresponding pins of the processor 312 and/or 322). In the case where both power supplies 330 and 332 work normally, the first signal may be a de-throttling signal (for example, a high-level signal).

The first signal from the supplying apparatus 306 may be received by the processor 312 and/or 322, and by the control device 302, where the first signal indicates whether the available power is less than the power required by the storage system. In one example, once again, assuming that the power supply 330 fails whereas the power supply 332 operates normally, the first signal is a throttling signal. A processor control signal (PROC_hot #) to the corresponding pins 317 and/or 327 of the processor 312 and/or 322, and a memory control signal (MEM_hot #) to corresponding pin 318 and/or 328 may be generated by the first signal passing through AND logic circuits 311 and/or 321 of the storage subsystem.

In some other embodiments, the control device 302 may determine whether the available power is less than the power required by the storage system in the following manner. First, the control device 302 receives a second signal from the supplying apparatus 306, the second signal indicates the current available power of the supplying apparatus 306. Then, the control device 302 may determine whether the available power is less than the power required by the storage system 304.

Returning to FIG. 2, at 240, in response to a determination that the available power is less than the power required by the storage system 304, the control device 302 adjusts an operation parameter of the storage system 304 based on the available power, so as to match the power required by the storage system 304 with the available power from the supplying apparatus 306.

Referring again to FIG. 3, in some embodiments, when PROC_hot # and MEM_hot # are of a low level, the processor will adjust a clock frequency of the processor to a low clock frequency, and thus power consumption of the memory will be reduced accordingly.

The reduction of the clock frequency can further lead to a reduction in the ability of the processors 312 and/or 322 for handling I/O operations in the storage system 304. Therefore, power consumption of respective components (such as a memory module and a storage disk, not shown in FIG. 3) that are associated with the processors 312 and/or 322 may also be reduced. As a result, the supplying apparatus 306 (including only one normal power supply 332) can supply the adjusted power consumption of the storage system 304.

The inventor has found that that hardware logic within the processor can usually only adjust the clock frequency of the processor from a predetermined normal level (e.g., predetermined 2.2 GHz) to a predetermined low level (e.g., predetermined 1.1 GHz) in response to a respective throttling signal, and vice versa. The current power of the storage system 304 will be reduced significantly and unnecessarily when operating at the reduced clock frequency.

Moreover, after operating at the predetermined low level, the microprocessor 334 within the power supply 332 might determine that the power supply capability (i.e., available power) exceeds the current power consumption of the storage system 304. In response to such a determination, the microprocessor 334 no longer generate and transmit (i.e., cancels or de-asserts) the throttling signal to the corresponding processor. The processor will then return to operating at its normal clock frequency (e.g., 2.2 GHz). As previously discussed, it is apparent that a high I/O level of the storage system 304 at this normal clock frequency cannot be supported by the power supply 332, so that a new round of throttling will be triggered again. Therefore, throttling and de-throttling will occur periodically before the power supply 330 returns to normal, thereby causing fluctuations in the performance of the storage system 304. The fluctuations may be represented as an undesirable fluctuation in the IOPS.

In order to reduce the above fluctuations, a redundant power supply can be provided in the supplying apparatus. However, designing the redundant power supply will increase the cost of the storage system.

There is another approach, in which the control device 302 adjusts the operation parameter of the storage system 304 based on the power that can be supplied by the power supply 332, so that the power consumption of the storage system 304 matches the power supply capability of the power supply. For example, if the power that can be supplied by the power supply 332 is 1800 W, when the control device 302 receives or detects that the first signal is a throttling signal, the control device 302 may adjust the operation parameter of the storage system 304 accordingly, so that power consumption of the storage system 304 is equal to or slightly below 1800 W. After the operation parameter of the storage system is adjusted, the throttling signal may be de-asserted accordingly. When operating the storage system with the adjusted parameter, the situation of repeatedly triggering of throttling as described above can be avoided, and there is no need to provide a redundant power supply.

In some embodiments, the control device 102 may determine the operation parameter of the storage system 304 based on the available power. For example, the operation parameter may be determined by performing a lookup in a lookup table, wherein the lookup table stores a plurality of operation parameters (for example, a maximum possible operation current of a processor core, ICCMax) and power consumptions of the storage system corresponding to the predetermined plurality of operation parameters.

In some examples, the operation parameter may be determined by a calculation based on the available power and information related to the storage system 304 (e.g., the number of CPUs, RAMs, ROMs, SSDs, and their nominal powers, etc.). For example, if the storage system 304 operates with the operation parameter, a difference between the available power and the power required by the adjusted storage system may be less than a predetermined threshold, so that a ratio of the available power to the stored power may be for example greater than 0.95 and less than or equal to 1. Subsequently, the storage system 304 will operate with the determined operation parameter.

In some other examples, the adjustment process at 240 may be performed in parallel with an internal hardware adjusting logic of the processor (for adjusting to the predetermined low level as mentioned above). Since the internal adjusting logic within the CPU is generally faster, the adjustment process at the 240 may be the final adjustment. In some alternative examples, after the throttling signal is triggered, the control device 302 may instruct the internal hardware adjusting logic of the processor to adjust the operation parameter based on the operation parameter determined at the 240, rather than based on the throttling signal In some other embodiments, the control device 302 may iteratively perform the following operations to adjust the operation parameter of the storage system 304. First, based on the available power, the operation parameter may be adjusted, for example, by reducing the predetermined value in one adjustment. Based on the adjusted operation parameter, the control device 302 may determine the power (power consumption) required by the storage system when operating with the adjusted operation parameter. The determination process may be implemented, for example, by the control device 302 performing a prediction based on the adjusted operation parameter and information related to the storage system 302, or by detecting the power consumption in real time. After a plurality of iterative adjustments, the control device 302 may cease adjusting the operation parameter in a accordance with a determination that the difference between the available power and the determined power required by the storage system is less than a predetermined threshold, so that the ratio of the available power to the power of the storage system may be for example greater than 0.95 and less than or equal to 1. As a result, the power required by the storage system 304 matches the available power from the supplying apparatus 306, and the throttling signal can be de-asserted accordingly. In this way, the control device 302 can reduce the power of the storage system to a reasonable value without a need of determining the power consumption of the storage system 304 operating under a plurality of operation parameters in advance.

In still other embodiments, the control device 302 may adjust at least one of parameters of the processor 312 and/or 322 of the storage system 304 based on the available power of the supplying apparatus 306, the parameters of the processor 312 and/or 322 includes: a clock frequency, operation power, an operation current and an operation voltage. It should be understood that the total power of the storage system can be reduced by adjusting any of the above parameters of the processor.

By implementing the above process 200, the operation parameter of the storage system (for example, the clock frequency of the CPU) will be adjusted to an appropriate value, so that the supplying apparatus, even having at least one fault power supply, can still supply power to the storage system stably and efficiently. When operating at the adjusted operation parameter, the performance of the storage system can be at a higher level, while the performance of the storage system can remain stable.

Figure 4:
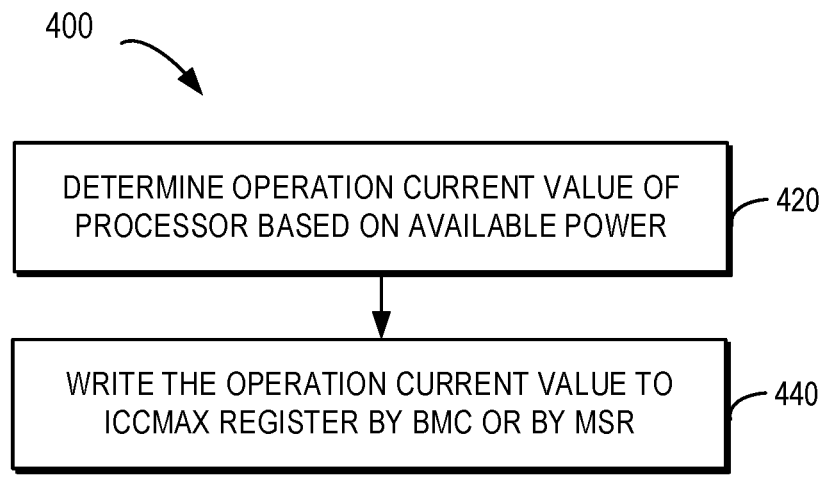
FIG. 4 illustrates a flowchart of a process of adjusting an operation current of a processor according to an embodiment of the present disclosure.

FIG. 4 illustrates a flowchart of a process 400 for adjusting an operation current of a processor according to an embodiment of the disclosure. Specifically, FIG. 4 describes the detailed process of 204 of FIG. 2. The process 400 may be implemented in the control device 102 shown in FIG. 1, or the control device 302 shown in FIG. 3, or other suitable devices. For ease of description, the process 400 is described below in conjunction with the system architecture 300 shown in FIG. 3. It should be understood that the process 400 may further include additional acts not shown and/or acts as shown may be omitted, and the scope of the present disclosure is not limited in this regard.

At 420, the control device 302 may determine an operation current value for the processor based on the available power.

Referring to FIG. 3, in some embodiments, the processors 312 and 322 may include ICCMax (maximum possible current of the core) registers 315 and 325, respectively. The ICCMax register is provided to limit the maximum current of the CPU core. The parameter of the ICCMax register may be configured, but the parameter cannot be configured to exceed an upper limit, which means that modifying the parameter of the ICCMax register may cause the maximum current of the CPU core to be limited, which in turn leads to changes in CPU performance. Therefore, the control device 302 may adjust the power of the processor 312 and/or 322 by configuring a current of the ICCMax registers 315 and 325, so that the power of the entire storage system 304 can be adjusted. The method for determining the operation current of the processor may be similar to the method of adjusting the operation parameter of the storage system 304 described above, and details of which are omitted. In one example, a normal value of ICCMax for one core of the processor 312 and/or 322 may be configured as 15A, whereas an upper limit for the one core of the processor 312 and/or 322 is 17A.

In some embodiments, the storage subsystems 310 and 320 may further include a Baseboard Management Controllers (BMC) 313 and 323, respectively. The baseboard management controller may be a dedicated microcontroller embedded in the storage system (e.g., a main board of the storage processor). For example, the processor 312 and the BMC 313 may be connected to each other through a Platform Environment Control Interface (PECI) 314. The BMC 313 may read from and write into the processor and internal registers (such as the ICCMax register 315) of the processor through the PECI 314.

In other embodiments, the processors 312 and 322 may further include MSR registers 316 and 326, respectively. MSR is an abbreviation of Model Specific Registers, a configuration of which is related to a type of the CPU. The parameter of the ICCMax register may be set by the CPU itself through read (R)/write (W) by the MSR.

Returning to FIG. 4, at 440, the control device 302 may send a command to the BMC or MSR so that the BMC of the storage system or the MSR of the processor writes adjusted operation current to the ICCMax register of the processor.

Referring again to FIG. 3, in some embodiments, the control device 302 may send a command to the BMC 313, so as to instruct the BMC 313 to modify the parameter of ICCMax register 315 via the PECI 314 based on a value of the adjusted operation current included in the command (e.g., according to a value determined at 420).

In other embodiments, the control device 302 may send a command to the MSR 316, so as to instruct the MSR 316 to modify the parameter of ICCMax register 315 based on a value of the adjusted operation current included in the command (e.g., according to a value determined at 420).

Setting the parameter of the ICCMax register through BMC via PECI, or through MSR as described above both support runtime setting. In one example, the above setting process may adjust ICCMax value with a resolution (step size) of 0.125A. The parameters of the ICCMax register 325 may also be adjusted in a similar manner.

It should be understood that the control device 320 may adjust an operation parameter for only one of the storage subsystems 310 and 320, while keeping the operation parameter of the other storage subsystem unchanged. The control device 320 may also adjust the operation parameter for the storage subsystems 310 and 320 simultaneously, where adjustments to the storage subsystems 310 and 320 may be the same or different.

By implementing the above process 400, the control device 302 may match the power consumption of the storage system with the available power of the power supply by adjusting the parameter (current) of the ICCMax register of the processor when a throttling event occurs. In this way, the frequency of the processor will be adjusted to an appropriate value, so that the performance of the storage system can be at a higher level, while the performance of the storage system can remain stable.

Figure 5:
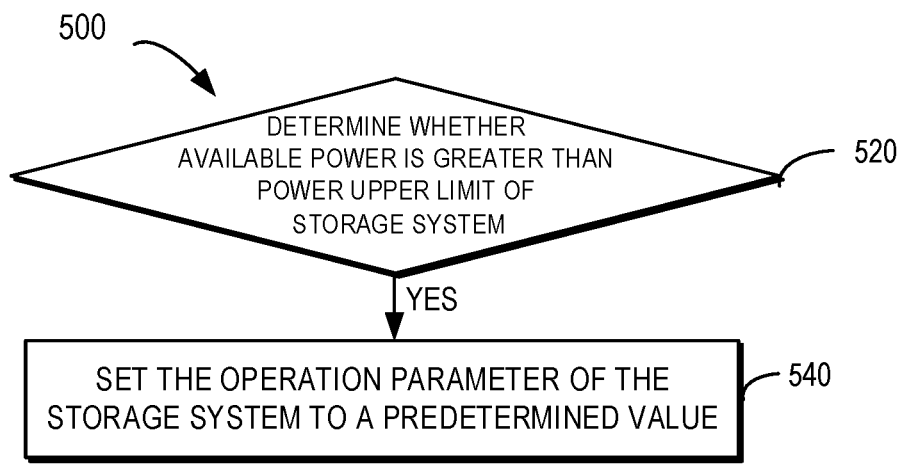
FIG. 5 illustrates a flowchart of a process of controlling a storage system according to an embodiment of the present disclosure.

In some embodiments, after the operation parameter of the storage system is adjusted, e.g., at 240, if the available power of the supplying apparatus increases (e.g., the fault power supply returns to be normal) to a predetermined level, a further process of controlling the storage system might be needed. FIG. 5 shows a flowchart of this further process 500 of controlling the storage system according to an embodiment of the present disclosure. The process 500 may be implemented in the control device 102 shown in FIG. 1, or the control device 302 shown in FIG. 3, or other suitable devices. For ease of description, the process 500 is described below in conjunction with the system architecture 300 shown in FIG. 3. It should be understood that the process 500 may also include additional acts not shown and/or acts as shown may be omitted, and the scope of the present disclosure is not limited in this regard.

At 520, the control device 302 determines whether the available power of the supplying apparatus 306 is greater than a power upper limit of the storage system 304.

Referring to FIG. 3, assuming that the power supply 330 is faulty and the power supply 332 is normal, in some embodiments, the control device 302 may, for example, start a monitoring thread. The monitoring thread may periodically (e.g., one time per 3 seconds) monitor the storage system and the supplying apparatus, so as to perform, e.g., the process 200 when appropriate. For example, the monitoring thread can also periodically (e.g., one time per 3 seconds) detect whether the available power of the supplying apparatus 306 has changed (e.g., increased), after the operation parameter of the storage system has already been adjusted by the above process (e.g., at 240). It should be understood that the monitoring thread may also monitor other parameters of the storage system, such as a current power consumption of the storage system, operation parameters of the storage system, and IOPS of the system.

If the power supply 330 returns to be normal again, the control device may determine a power restoration event, for example, through the monitoring thread by determining that the power that can be supplied by the supplying apparatus 306 is greater than the power upper limit of the storage system 304. In this case, the available power that can be supplied by the supplying apparatus 306 will be greater than a maximum power that the storage system can consume. In this case, the control device cannot adjust the operation parameter according to, for example, the process described at 240, since it might exceed a configurable range of the operation parameters of the storage system 304 (for example, exceeding the current upper limit value allowed by the CPU ICCMAX register) if the adjustment is continued to be performed according to the process described at 240.

Returning to FIG. 5, at 540, in response to a determination that the available power is greater than the power upper limit of the storage system, the control device 302 sets the operation parameters of the storage system to a predetermined value.

In the case as described above, the control device 302 may determine that there is no need to limit the operation parameter of the storage system 304 (e.g., the processor 312). For example, the control device 302 may set the parameters of the ICCMax register 315 through the BCI 313 via the PECI 314, or through the MSR 316, so that the processor 312 may operate at a predetermined, normal clock frequency.

Table 1 describes a comparison of power consumptions of the storage system in three different operation modes. The comparison shows test results on an example high-availability dual storage system (for example, EMC equipment).

The storage system includes a supplying apparatus with two power supplies, two processors CPU1 and CPU2, two sets of memory modules MEM1 and MEM2, and 25 solid-state storage disks based on NVMe (Non-Volatile Memory Express), where both CPU1 and CPU2 are of a 205W CPU type, and MEM1 and MEM2 both contain 24 memories of 64 GB, DDR4 type. The normal operation mode refers to an operation mode in which the available power that can be supplied by the supplying apparatus is not less than the power required by the storage system. The predetermined throttling mode refers to an operation mode in which the available power that can be supplied by the supplying apparatus is less than the power required by the storage system, and the CPU 1 and/or the CPU 2 operate at a predetermined low current. The adjusted throttling mode refers to an operation mode in which the available power that can be supplied by the supplying apparatus is less than the power required by the storage system, and CPU1 and/or CPU2 operate at the operation current determined according to the embodiments of the present disclosure.

It should be understood that the values of power consumption may be indicative of the performance of the storage system. As can be seen from Table 1, using the method of adaptively adjusting the maximum current of the processor core (Mode 3) according to the embodiments of the present disclosure, the storage system may still achieve a higher overall power consumption (in Mode 3, an input power of the power supply is 1,834.90 W, which is much higher than the 833.19 W in Mode 2, and is only about 600 W lower than the power in Mode 1 where all the power supplies are normal) even if there is a fault power supply, thereby achieving a higher storage performance. At the same time, the higher overall power consumption will not cause the remaining power supplies to repeatedly cancel the throttling signal and generate the throttling signal again, thereby ensuring the stability of the storage performance.

computer program instructions stored in a read only memory (ROM) 602 or computer program instructions loaded from a storage unit 608 to a random access memory (RAM) 603. The RAM 603 may also store various programs and data as required by operation of the device 600. The CPU 601, the ROM 602 and the RAM 603 are connected to one another via a bus 604. An input/output (I/O) interface 605 is also connected to the bus 604.

The following components in the device 600 are connected to the I/O interface 605: an input unit 606 including a keyboard, a mouse, or the like; an output unit 607 such as various types of displays and speakers; a storage unit 608 such as a magnetic disk or optical disk; and a communication unit 609 such as a network card, a modem, a wireless communication transceiver or the like. The communication unit 609 allows the device 600 to exchange information/data with other devices via a computer network such as the Internet and/or various telecommunication networks.

The processing unit 601 performs various methods and processes described above, for example any one of processes 200, 400 and 500. For example, in some embodiments, any one of the processes 200, 400 and 500 may be implemented as a computer software program or a computer program product, which is tangibly contained in a machine-readable medium, for example, the storage unit 608. In some embodiments, part or all of the computer program may be loaded and/or installed on the device 600 via ROM 602 and/or communication unit 609. When the computer program is loaded in the RAM 603 and executed by CPU 601, one or more steps of any one of the processes 200, 400 and 500 described above may be executed. Alternatively, in other embodiments, the CPU 601 may be configured in any other suitable manners (e.g., by virtue of a firmware) to execute any one of the processes 200, 400 and 500.

The present disclosure may be a method, device, system and/or computer program product. The computer program product may include a computer readable storage medium on which computer readable program instructions for executing various aspects of the present disclosure are embodied.

The computer readable storage medium may be a tangible device that may retain and store instructions for use by an instruction execution device. The computer readable storage medium may be, for example, but is not limited to, an electronic storage device, a magnetic storage device, an

TABLE 1

| Operation mode | Input power of power supply(ies) (W) | Maximum current of processor cores ICCMax (A) | Power consumption of processors (W) | Power consumption of memory modules (W) | Power consumption of storage disks (W) |
|---|---|---|---|---|---|
| Mode 1: normal mode | 2434.00 | Default normal value | CPU1 = 199.96 CPU2 = 203.65 | MEM1 = 77.64 MEM2 = 74.18 | 545 |
| Mode 2: predetermined throttling mode | 833.19 | Predetermined low current in throttling mode | CPU1 = 60.44 CPU2 = 71.34 | MEM1 = 18.31 MEM2 = 19.18 | 225 |
| Mode 3: adjusted throttling mode | 1834.90 | 80.63 | CPU1 = 165.23 CPU2 = 173.30 | MEM1 = 30.71 MEM2 = 29.28 | 376 |

Figure 6:
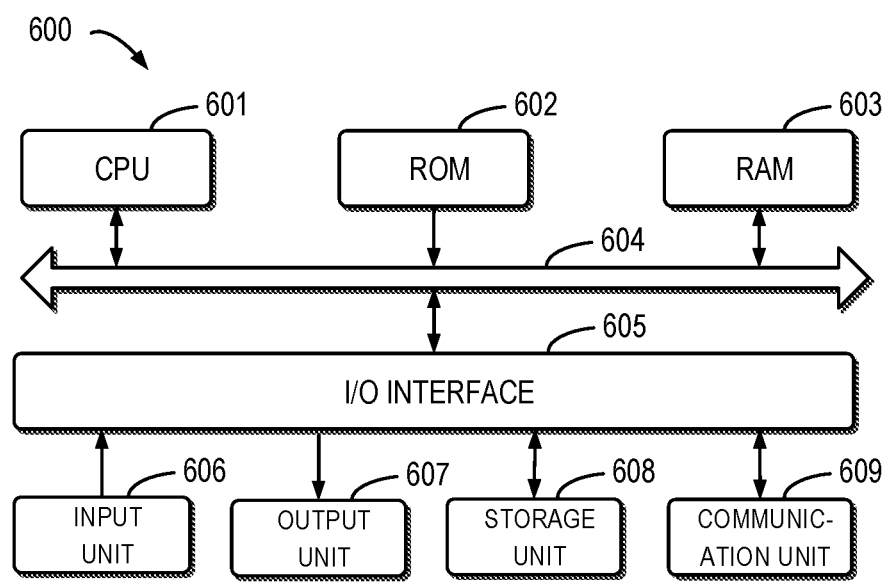
FIG. 6 illustrates a block diagram of an example device that may be used to implement embodiments of the present disclosure.

FIG. 6 illustrates a schematic block diagram of an example device 600 that may be used to implement embodiments of the present disclosure. For example, the electronic device 600 may be used to implement the control device 102 shown in FIG. 1. As shown in the figure, the device 600 includes a central processing unit (CPU) 601 which is capable of performing various processes in accordance with optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, device (systems), and computer program products according to embodiments of the disclosure. It will be understood that each block of the flowchart illustrations and/or block diagrams, and combinations of blocks in the flowchart illustrations and/or block diagrams, may be implemented by computer readable program instructions.

These computer readable program instructions may be provided to a processing unit of a general purpose computer, special purpose computer, or other programmable data processing device to produce a machine, such that the instructions, which execute via the processing unit of the computer or other programmable data processing device, create means (e.g., specialized circuitry) for implementing the functions/acts specified in the flowchart and/or block diagram block or blocks. These computer readable program instructions may also be stored in a computer readable storage medium that may direct a computer, a programmable data processing device, and/or other devices to function in a particular manner, such that the computer readable storage medium having instructions stored therein includes an article of manufacture including instructions which implement aspects of the functions/acts specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

According to some embodiments of the present disclosure, there is provided a computer-readable medium storing thereon a computer program which, upon being executed by a processor, implements the method according to the present disclosure.

Those skilled in the art would understand that various steps of the method of the disclosure may be implemented via a general-purpose computing device, which may be integrated on a single computing device or distributed over a network composed of a plurality of computing devices. Optionally, they may be implemented using program code executable by the computing device, such that they may be stored in a storage device and executed by the computing device; or they may be made into respective integrated circuit modules or a plurality of modules (or components) or steps therein may be made into a single integrated circuit module for implementation. In this way, the present disclosure is not limited to any specific combination of hardware and software.

It should be appreciated that although several means or sub-means (e.g., circuits) of the device have been mentioned in the detailed description above, such partition is only by way of example and without limitation. Actually, according to the embodiments of the present disclosure, features and functions of two or more apparatuses described above may be instantiated in one apparatus. In turn, features and functions of one apparatus described above may be further partitioned to be instantiated by various apparatuses.

What has been mentioned above are only some optional embodiments of the present disclosure and are not intended to limit the present disclosure. For those skilled in the art, the present disclosure may have various alternations and changes. Any modifications, equivalents and improvements made within the spirit and principles of the present disclosure should be included within the scope of the present disclosure.

We claim:

1. A method of controlling a storage system, comprising:
   determining whether available power capable of being supplied by a supplying apparatus of the storage system is less than power required by the storage system; and
   in response to a determination that the available power is less than the power required by the storage system, adjusting an operation parameter of the storage system based on the available power so as to match the power required by the storage system with the available power,
   wherein adjusting the operation parameter of the storage system comprises:
   adjusting at least one of parameters of a processor of the storage system based on the available power, the parameters of the processor comprising a clock frequency, operation power, an operation current and an operation voltage.

2. The method according to claim 1, wherein adjusting at least one of the parameters of the processor comprises:
   writing, by a baseboard management controller of the storage system or a model specific register of the processor, the adjusted operation current to an ICCMax register of the processor.

3. The method according to claim 1, wherein adjusting the operation parameter of the storage system based on the available power comprises iteratively performing the following:
   adjusting the operation parameter based on the available power;
   determining the power required by the storage system based on the adjusted operation parameter; and
   in accordance with a determination that a difference between the available power and the determined power required by the storage system is less than a predetermined threshold, ceasing adjusting the operation parameter.

4. The method according to claim 1, further comprising:
   determining whether the available power is greater than a power upper limit of the storage system; and
   in response to a determination that the available power is greater than the power upper limit of the storage system, setting the operation parameter of the storage system to a predetermined value.

5. The method according to claim 1, wherein determining whether the available power is less than the power required by the storage system comprises:
   providing information about the power required by the storage system to the supplying apparatus; and
   receiving a first signal from the supplying apparatus, the first signal indicating whether the available power is less than the power required by the storage system.

6. The method according to claim 1, further comprising:
   receiving a second signal from the supplying apparatus, the second signal indicating the available power; and
   determining whether the available power is less than the power required by the storage system.

7. An electronic device, comprising:
   a processor; and
   a memory coupled to the processor and having instructions stored therein, the instructions, when executed by the processor, causing the electronic device to perform acts comprising:
   determining whether available power capable of being supplied by a supplying apparatus of the storage system is less than power required by the storage system; and
   in response to a determination that the available power is less than the power required by the storage system, adjusting an operation parameter of the storage system based on the available power so as to match the power required by the storage system with the available power,
   wherein adjusting the operation parameter of the storage system comprises:
   adjusting at least one of parameters of a processor of the storage system based on the available power, the parameters of the processor comprising a clock frequency, operation power, an operation current and an operation voltage.

8. The electronic device according to claim 7, wherein adjusting at least one of the parameters of the processor comprises:
   writing, by a baseboard management controller of the storage system or a model specific register of the processor, the adjusted operation current to an ICCMax register of the processor.

9. The electronic device according to claim 7, wherein adjusting the operation parameter of the storage system based on the available power comprises iteratively performing the following:
   adjusting the operation parameter based on the available power;
   determining the power required by the storage system based on the adjusted operation parameter; and
   in accordance with a determination that a difference between the available power and the determined power required by the storage system is less than a predetermined threshold, ceasing adjusting the operation parameter.

10. The electronic device according to claim 7, wherein the acts further comprise:
    determining whether the available power is greater than a power upper limit of the storage system; and
    in response to a determination that the available power is greater than the power upper limit of the storage system, setting the operation parameter of the storage system to a predetermined value.

11. The electronic device according to claim 7, wherein determining whether the available power is less than the power required by the storage system comprises:
 providing information about the power required by the storage system to the supplying apparatus; and
 receiving a first signal from the supplying apparatus, the first signal indicating whether the available power is less than the power required by the storage system.

12. The electronic device according to claim 7, wherein the acts further comprise:
 receiving a second signal from the supplying apparatus, the second signal indicating the available power; and
 determining whether the available power is less than the power required by the storage system.

13. A computer program product having a non-transitory computer readable medium which stores a set of instructions to control a storage system; the set of instructions, when carried out by computerized circuitry, causing the computerized circuitry to perform a method of:
 determining whether available power capable of being supplied by a supplying apparatus of the storage system is less than power required by the storage system; and
 in response to a determination that the available power is less than the power required by the storage system, adjusting an operation parameter of the storage system based on the available power so as to match the power required by the storage system with the available power,
wherein adjusting the operation parameter of the storage system comprises:
 adjusting at least one of parameters of a processor of the storage system based on the available power, the parameters of the processor comprising a clock frequency, operation power, an operation current and an operation voltage.

14. The computer program product of claim 13, wherein adjusting at least one of the parameters of the processor comprises:
 writing, by a baseboard management controller of the storage system or a model specific register of the processor, the adjusted operation current to an ICCMax register of the processor.

15. The computer program product of claim 13, wherein adjusting the operation parameter of the storage system based on the available power comprises iteratively performing the following:
 adjusting the operation parameter based on the available power;
 determining the power required by the storage system based on the adjusted operation parameter; and
 in accordance with a determination that a difference between the available power and the determined power required by the storage system is less than a predetermined threshold, ceasing adjusting the operation parameter.

16. The computer program product of claim 13, further comprising:
 determining whether the available power is greater than a power upper limit of the storage system; and
 in response to a determination that the available power is greater than the power upper limit of the storage system, setting the operation parameter of the storage system to a predetermined value.

17. The computer program product of claim 13, wherein determining whether the available power is less than the power required by the storage system comprises:
 providing information about the power required by the storage system to the supplying apparatus; and
 receiving a first signal from the supplying apparatus, the first signal indicating whether the available power is less than the power required by the storage system.

18. The computer program product of claim 13, further comprising:
 receiving a second signal from the supplying apparatus, the second signal indicating the available power; and
 determining whether the available power is less than the power required by the storage system.

19. A method of controlling a storage system, comprising:
 determining whether available power capable of being supplied by a supplying apparatus of the storage system is less than power required by the storage system; and
 in response to a determination that the available power is less than the power required by the storage system, adjusting an operation parameter of the storage system based on the available power so as to match the power required by the storage system with the available power,
wherein adjusting the operation parameter of the storage system based on the available power comprises iteratively performing the following:
 adjusting the operation parameter based on the available power;
 determining the power required by the storage system based on the adjusted operation parameter; and
 in accordance with a determination that a difference between the available power and the determined power required by the storage system is less than a predetermined threshold, ceasing adjusting the operation parameter.

20. A method of controlling a storage system, comprising:
 determining whether available power capable of being supplied by a supplying apparatus of the storage system is less than power required by the storage system;
 in response to a determination that the available power is less than the power required by the storage system, adjusting an operation parameter of the storage system based on the available power so as to match the power required by the storage system with the available power;
 determining whether the available power is greater than a power upper limit of the storage system; and
 in response to a determination that the available power is greater than the power upper limit of the storage system, setting the operation parameter of the storage system to a predetermined value.

* * * * *